(12) United States Patent
Ok et al.

(10) Patent No.: US 8,117,563 B2
(45) Date of Patent: Feb. 14, 2012

(54) THREE-DIMENSIONAL MOTION GRAPHIC USER INTERFACE AND METHOD AND APPARATUS FOR PROVIDING THE SAME

(75) Inventors: Joon-ho Ok, Seoul (KR); Hyun-joo Kang, Seoul (KR); Mi-jeong Kim, Seoul (KR); Sung-woo Kim, Seoul (KR); Sang-hyun Park, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 764 days.

(21) Appl. No.: 11/198,842

(22) Filed: Aug. 8, 2005

(65) Prior Publication Data

US 2006/0031876 A1 Feb. 9, 2006

(30) Foreign Application Priority Data

Aug. 7, 2004 (KR) .................. 10-2004-0062248

(51) Int. Cl.
*G06F 3/00* (2006.01)
*G06F 3/14* (2006.01)
*G06F 3/048* (2006.01)
*G06F 15/00* (2006.01)
*G06K 15/00* (2006.01)
*G09G 5/00* (2006.01)
*G06T 17/00* (2006.01)

(52) U.S. Cl. ........ 715/848; 715/775; 715/778; 715/782; 715/836; 715/850; 345/419

(58) Field of Classification Search .................. 715/848, 715/775, 778, 782, 836, 850; 345/419
See application file for complete search history.

(56) References Cited

U.S. PATENT DOCUMENTS 4,601,003 A * 7/1986 Yoneyama et al. ........... 715/775
5,303,388 A * 4/1994 Kreitman et al. ............. 715/836
(Continued)

FOREIGN PATENT DOCUMENTS

JP 3-167625 A 7/1991
(Continued)

OTHER PUBLICATIONS

Chinese Office Action dated Aug. 18, 2006.

*Primary Examiner* — Chat Do
*Assistant Examiner* — Jordany Nunez
(74) *Attorney, Agent, or Firm* — Sughrue Mion, PLLC

(57) ABSTRACT

A three-dimensional motion graphic user interface (MGUI) and a method and apparatus for providing the same. The apparatus includes a control module which creates a polyhedron component that can be opened and that has at least one opening face and an internal space containing at least one information object related to information displayed on a face of the polyhedron component. A storing module stores the polyhedron component created by the control module, and an input module inputs data about a user's action with respect to the polyhedron component. A user interface module assigns predetermined attributes to at least one of a plurality of subordinate faces, maps information displayed on an information face according to the predetermined attributes, processes motion of the polyhedron component according to the input data, changes an information display according to the motion, and manages at least one group of a plurality of polyhedron components. An output module displays a processing result of the user interface module.

35 Claims, 15 Drawing Sheets

U.S. PATENT DOCUMENTS

| | | | | |
|---|---|---|---|---|
| 5,347,628 A | * | 9/1994 | Brewer et al. | 715/775 |
| 5,452,414 A | * | 9/1995 | Rosendahl et al. | 715/836 |
| 5,515,486 A | * | 5/1996 | Amro et al. | 715/848 |
| 5,745,096 A | * | 4/1998 | Ludolph et al. | 715/764 |
| 6,111,581 A | * | 8/2000 | Berry et al. | 345/419 |
| 6,121,969 A | * | 9/2000 | Jain et al. | 715/850 |
| 6,157,383 A | | 12/2000 | Loop | |
| 6,259,458 B1 | * | 7/2001 | Theisen et al. | 345/440 |
| 6,344,863 B1 | | 2/2002 | Capelli et al. | |
| 6,621,509 B1 | | 9/2003 | Eiref et al. | |
| 6,636,246 B1 | * | 10/2003 | Gallo et al. | 715/805 |
| 6,714,201 B1 | * | 3/2004 | Grinstein et al. | 345/474 |
| 7,043,695 B2 | * | 5/2006 | Elber et al. | 715/771 |
| 7,216,305 B1 | * | 5/2007 | Jaeger | 715/849 |
| 2003/0001898 A1 | | 1/2003 | Bernhardson | |
| 2003/0142136 A1 | * | 7/2003 | Carter et al. | 345/782 |
| 2004/0117727 A1 | * | 6/2004 | Wada | 715/500 |

FOREIGN PATENT DOCUMENTS

JP     11-95888 A     4/1999

* cited by examiner

FRONT VIEW SIDE VIEW

OPENING FACE (1310)

1320

THREE-DIMENSIONAL MOTION GRAPHIC USER INTERFACE AND METHOD AND APPARATUS FOR PROVIDING THE SAME

CROSS-REFERENCE TO RELATED APPLICATION

This application claims priority from Korean Patent Application No. 10-2004-0062248 filed on Aug. 7, 2004 in the Korean Intellectual Property Office, the disclosure of which is incorporated herein by reference in its entirety.

BACKGROUND OF THE INVENTION

1. Field of the Invention

The present invention relates to a three-dimensional motion graphic user interface (MGUI) and a method and apparatus for providing the same, and more particularly, to a method and apparatus for providing information, in which visual effects and the efficiency of using information are improved by providing information to a three-dimensional user interface that changes dynamically according to user behavior.

2. Description of the Related Art

User interfaces (UIs) of conventional digital devices use graphic user interface (GUI) components of personal computer (PC) operating systems. As a result, most UIs are two-dimensional, and even in the case of three-dimensional UIs, most of them are static and have features that are similar to those of conventional two-dimensional UIs.

FIG. 1 illustrates a UI using a GUI component supported in a conventional PC operating system.

Conventional UIs as shown in FIG. 1 are two-dimensional and static. As a result, information displayed by UIs usually takes the form of text, which is non-optimal. Thus, the effectiveness with which visual information can be provided is limited. Although three-dimensional components exist among components provided by conventional GUIs, they still fall into the two-dimensional concept, and although they are viewed as three-dimensional, their advantages as three-dimensional structures are not fully utilized in their application. GUIs of PC operating systems are not suitable for all digital devices. Also, in particular, in the case of devices that provide multimedia content, conventional UIs are limited in the extent to which they can stimulate a user and provide entertainment functions. To solve the foregoing problems, various inventions (e.g., U.S. Pat. No. 6,344,863, entitled "Three-Dimensional GUI Windows with Variable-Speed Perspective Movement") have been suggested, but problems still remain unsolved. Therefore, there is a need for a dynamic and realistic UI for digital devices that can provide a variety of content.

SUMMARY OF THE INVENTION

The present invention provides a method and apparatus for providing information that is intuitive and satisfies user's emotions by providing a UI that uses a three-dimensional component.

The present invention also provides a three-dimensional folder concept to arrange or move information objects in units of a group or an object in a three-dimensional GUI environment.

The present invention also reduces an error in a user's recognition by providing a natural information flow in a three-dimensional GUI environment.

The present invention also allows a user to view and control information from various angles, thereby enabling the user to understand information more clearly.

The present invention also makes it possible to display more information than conventional UIs by displaying information on faces of a polyhedron component.

The above stated objects as well as other objects, features and advantages, of the present invention will become clear to those skilled in the art upon review of the following description.

According to an aspect of the present invention, there is provided a three-dimensional motion graphic user interface (MGUI) including at least one opening face which forms a polyhedron component, and an internal space which is surrounded by faces of the polyhedron component and contains at least one information object related to information displayed on a face of the polyhedron component, wherein at least one of a plurality of faces that are subordinate to the polyhedron component has predetermined attributes, and the information displayed on the face of the polyhedron component includes a polyhedron component that is displayed differently according to the predetermined attributes.

According to another aspect of the present invention, there is provided an apparatus for providing a three-dimensional motion graphic user interface (MGUI), the apparatus including a control module which creates a polyhedron component having at least one opening face which forms a polyhedron component and having an internal space which is surrounded by faces of the polyhedron component and contains at least one information object related to information displayed on a face of the polyhedron component, a storing module which stores the polyhedron component created by the control module, an input module to which data about a user's action with respect to the polyhedron component is input, a user interface module which assigns predetermined attributes to at least one of a plurality of faces subordinate to the polyhedron component, maps information displayed on an information face according to the predetermined attributes, processes motion of the polyhedron component according to the data about the user's action input through the input module, and changes an information display according to the motion of the polyhedron component, and an output module which displays a processing result of the user interface module.

According to still another aspect of the present invention, there is provided a method for providing a three-dimensional motion graphic user interface (MGUI), the method including a user accessing a polyhedron component having at least one opening face which forms a polyhedron component and having an internal space which is surrounded by faces of the polyhedron component and contains at least one information object related to information displayed on a face of the polyhedron component, the user inputting an action that generates motion of the polyhedron component, and motion of the polyhedron component being generated according to the user's action.

According to still another aspect of the present invention, there is provided a method for providing a three-dimensional motion graphic user interface (MGUI), the method including selecting a specific polyhedron component from a group of polyhedron components that have at least one opening face that can be opened on an edge that is attached to the polyhedron component, and that have an internal space that is surrounded by faces of the polyhedron component and that contains at least one information object related to information displayed on a face of the polyhedron component, highlighting the selected polyhedron component, displaying detail information of information displayed on an information face of the selected polyhedron component, and changing the way of displaying the other polyhedron components of the group of polyhedron components.

According to still another aspect of the present invention, there is provided a recording medium having a computer readable program recorded therein for executing a method for providing a three-dimensional motion graphic user interface (MGUI), the method including a user accessing a polyhedron component including at least one opening face and an internal space which is surrounded by faces of the polyhedron component and which contains at least one information object related to information displayed on a face of the polyhedron component, the user inputting an action that generates motion of the polyhedron component, and motion of the polyhedron component being generated according to the user's action.

According to still another aspect of the present invention, there is provided a recording medium having a computer readable program recorded therein for executing a method for providing a three-dimensional motion graphic user interface (MGUI), the method including selecting a specific polyhedron component from a group of polyhedron components that have at least one opening face that can be opened on an edge that is attached to the polyhedron component, and that have an internal space that is surrounded by faces of the polyhedron component and that contains at least one information object related to information displayed on a face of the polyhedron component, highlighting the selected polyhedron component, displaying detail information of information displayed on an information face of the selected polyhedron component, and changing a way of displaying other polyhedron components of the group of polyhedron components.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
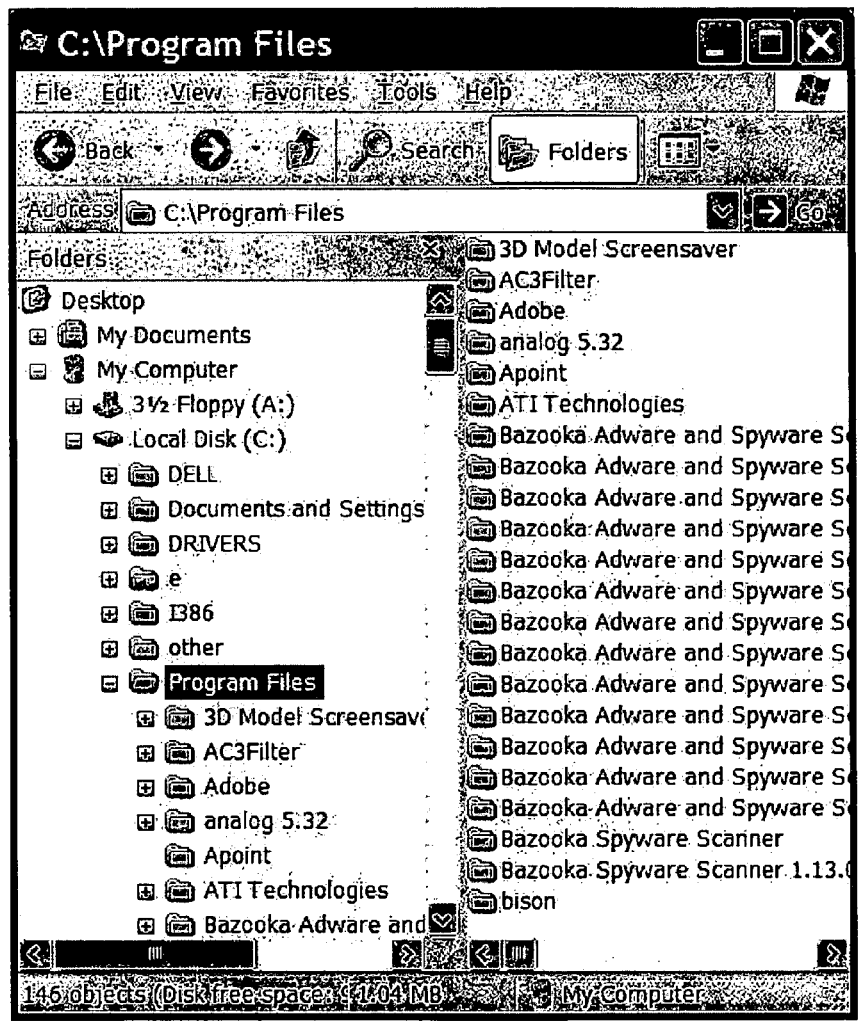
FIG. 1 illustrates a UI using a GUI component supported in a conventional PC operating system.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described in detail with reference to the accompanying drawings.

Figure 2:
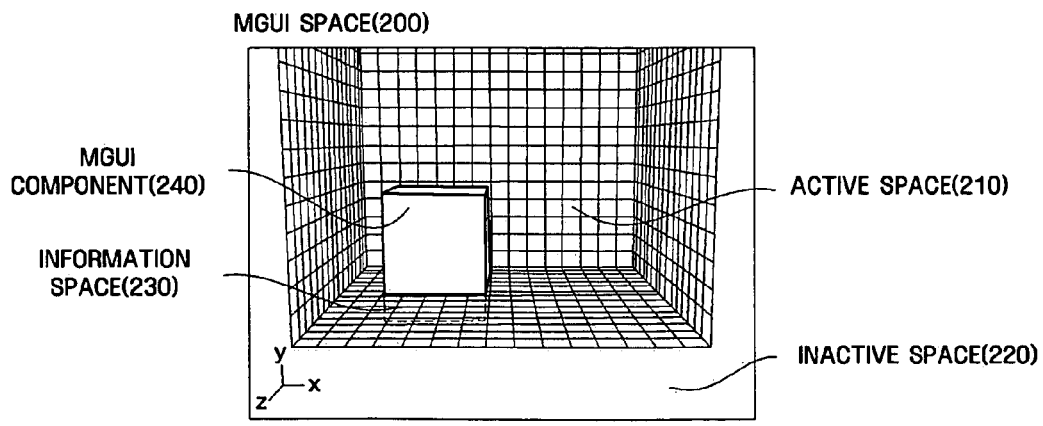
FIG. 2 illustrates the overall configuration of an MGUI according to an exemplary embodiment of the present invention.

FIG. 2 illustrates the overall configuration of an MGUI according to an exemplary embodiment of the present invention.

An MGUI is a UI capable of establishing a more dynamic GUI environment through a three-dimensional environment and motion graphics. An MGUI environment includes the following.

1. MGUI space
2. MGUI components
3. MGUI component presentation
4. MGUI camera view
5. MGUI information face and information space An MGUI space 200 is a space for establishing the MGUI environment and it is divided into an active space 210 and an inactive space 220 according to the characteristic of the space. The active space 210 can be used when a UI is designed. To present an MGUI component 240 in the active space 210, an area for an information space 230 should be designated within the active space 210. In other words, the information space 230 is an area where the MGUI component 240 can be actually placed within the active space 210. Also, the information space 230 is an area secured for smooth manipulation of information and space management.

The MGUI component 240 means a configuration object of the MGUI that provides information to a user while the user is interacting with it in the MGUI environment. The MGUI component 240 includes at least one information face. The MGUI component 240, and elements of the MGUI component 240, the information face, and the information space 230 will be described in detail later with reference to FIG. 3.

Presentation of the MGUI component 240 involves determining a way to manipulate a group of at least one component in the information space 230, motion generated during the manipulation, and determining how to present the component on a screen. Presentation of the MGUI component 240 will be described in detail later with reference to FIGS. 16 through 22.

The MGUI camera view means a viewpoint in the MGUI environment. Viewpoint movement means navigation in the MGUI space 200 and motion is generated in the entire MGUI space 200. The MGUI camera view is the main cause of motion in the MGUI environment, along with inherent motion attributes of the MGUI component 240, which will be described in detail later with reference to FIG. 15.

Figure 3A:
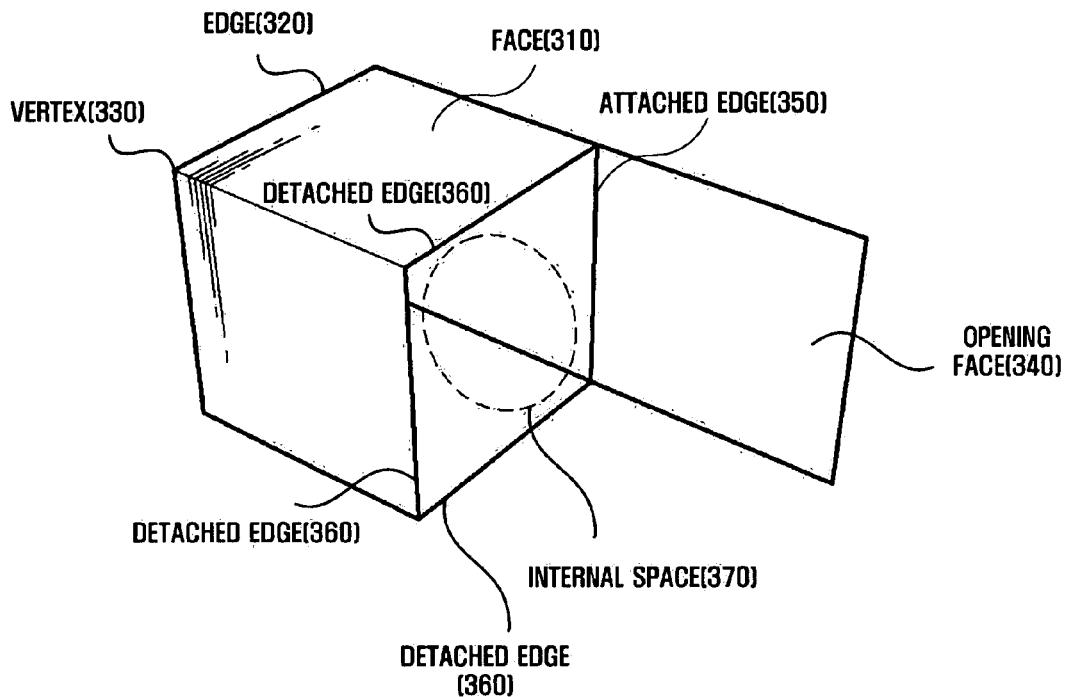
FIGS. 3A through 3C illustrate exemplary embodiments of a polyhedron component included in the MGUI.
Figure 3B:
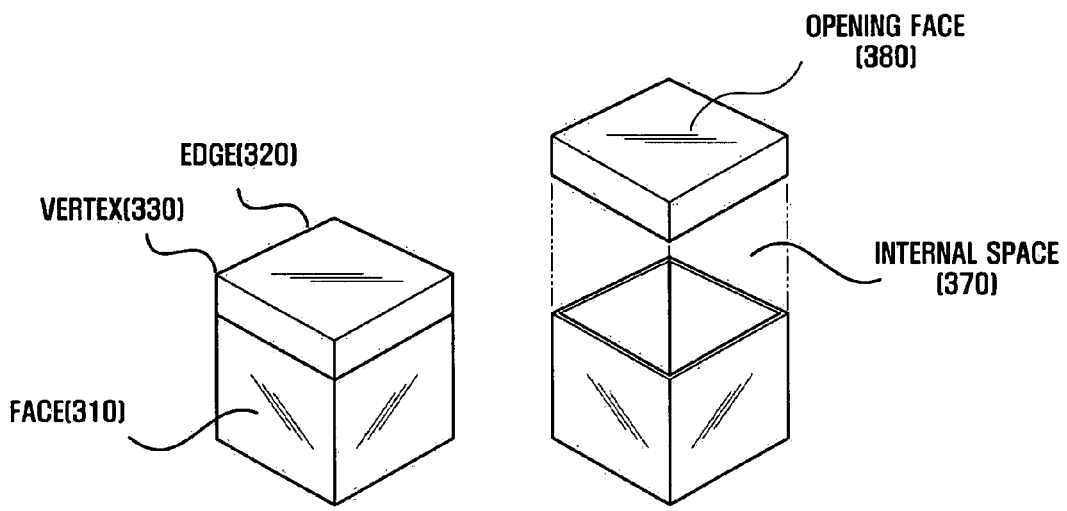
Figure 3C:
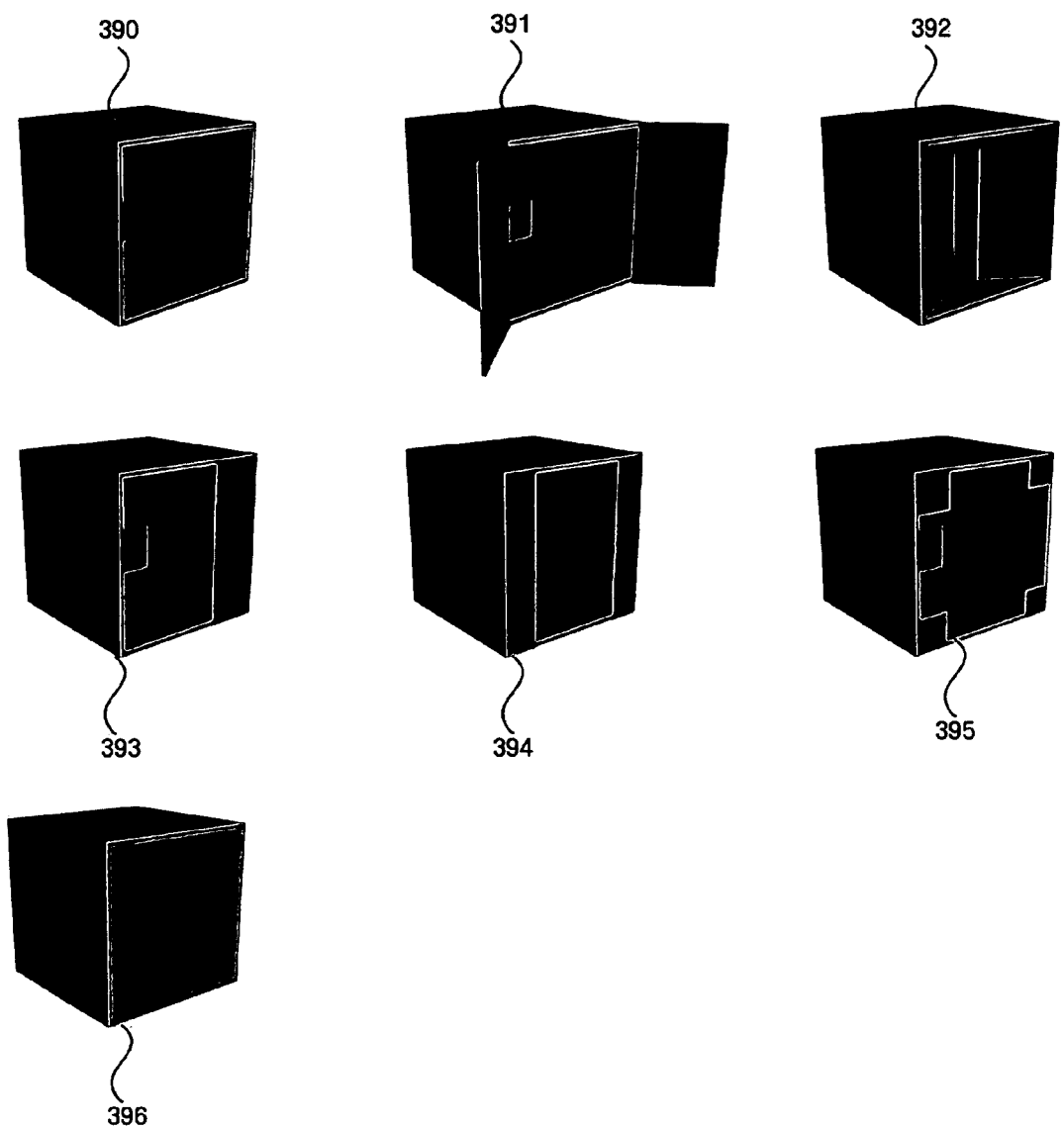

FIGS. 3A through 3C illustrate exemplary embodiments of an MGUI polyhedron component that can be opened.

The polyhedron component, which can be opened (hereinafter simply referred to as a polyhedron component) includes a plurality of faces 310, edges 320, and vertexes 330. The polyhedron component also includes at least one opening face 340 and 380 and an internal space 370 to contain at least one information object. A polyhedron is a geometrical figure such as a tetrahedron, heptahedron, hexahedron, or the like. A sphere can be approximated to a polyhedron made of numerous planes. In the following description, for convenient explanation of the invention, a hexahedron component will be described in detail.

All the faces of the polyhedron component may have attributes of an opening face. In one exemplary embodiment, as shown in FIG. 3A, the opening face 340 is opened like a door. The edges of the opening face 340 can be divided into one attached edge 350 and a plurality of detached edges 360. The opening face 340 is opened about an axis of the attached edge 350. In another exemplary embodiment, an opening face 380 may be entirely separated from the main body of the polyhedron component, like a cover, as shown in FIG. 3B. FIG. 3C illustrates exemplary embodiments of opening the polyhedron. The opening face 340 that is opened like a door may be opened inwardly toward the polyhedron component (390). Alternatively, the opening face 340 may be divided into at least two faces that open (391 and 392). Alternatively, the opening face 340 may be opened like a sliding door (393). Alternatively, the opening face 340 may be divided into at least two faces that are opened like sliding doors (394 and 395). Alternatively, the opening face 340 may be regarded as being opened if the transparency of the opening face 340 is high enough to make it transparent, and it can be regarded as being closed if the transparency of the opening face 340 is low enough to appear opaque.

In one exemplary embodiment, only one opening face of a polyhedron component can be opened at a time. In another exemplary embodiment, more than one opening face can be opened at a time.

The internal space 370 refers to the internal space of the polyhedron component when the opening face 340 is opened. The internal space 370 can contain at least one information object. Once the opening face 340 is opened, information objects contained in the internal space 370 perform predetermined operations. All the components of an MGUI can be contained in the internal space of a polyhedron component, and the number of components that can be contained in the internal space is not limited.

The polyhedron component has the following attributes: an identifier and a size as attributes of a polyhedron; a number, a color, transparency, information on whether a corresponding face is an information face as attributes of a face; and an edge color as an attribute of an edge. In addition, the polyhedron component has an opening speed of an opening face, an edge 350 attached to the polyhedron component and an edge 360 detached from the polyhedron component when the opening face is opened like a door, information about which face is an opening face, information about which face is an opening face when the opening face is opened like a door, information about objects contained in the polyhedron component, and information about the presentation and operations of the objects. Here, the information face means a face on which information can be displayed among a plurality of faces forming the polyhedron component. Since the inside of the opening face 340 may have attributes of an information face after the opening face 340 is opened, both the inside and the outside of the opening face 340 may be used as information faces. All the sides of the opening face 380 that is opened like a cover may be used as information faces. Thus, objects contained in the internal space 370 may be differentiated according to a face on which a focus is placed among faces forming the main body of the polyhedron component and faces forming the cover, and even objects displaying the same information may have different display forms. The information face will be described with reference to FIGS. 4A and 4B.

Figure 4A:
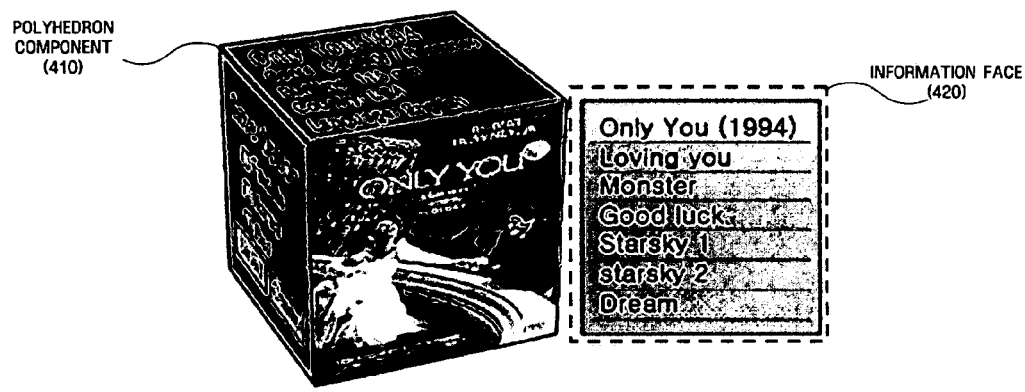
FIG. 4A illustrates an exemplary embodiment in which information is mapped onto faces of a polyhedron component.
Figure 4B:
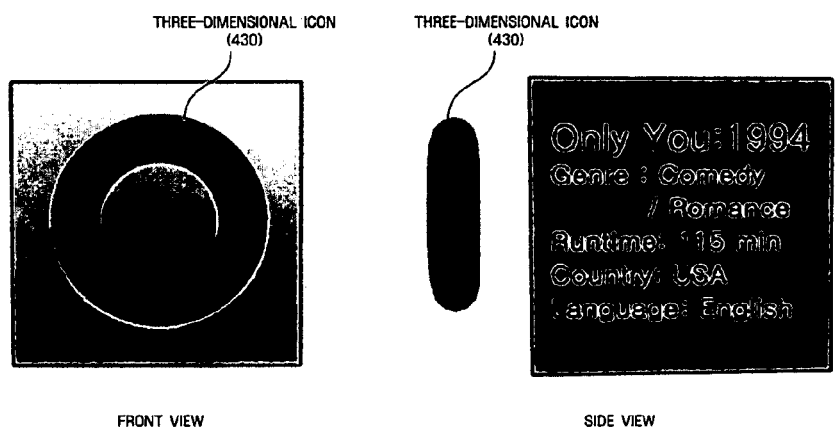
FIG. 4B illustrates a case where information mapped onto a face of the polyhedron component is three-dimensional information.

FIG. 4A illustrates an exemplary embodiment in which information is mapped onto faces of a polyhedron component, and FIG. 4B illustrates a case where information mapped onto a face of the polyhedron component is three-dimensional information.

An information face of an MGUI corresponds to a window of a conventional GUI. In the MGUI, the information face is subject to the MGUI component and such subjection can be made in the following two manners. First, the information face can exist as a face. Second, the information face can exist as a visualized form (e.g., the information face 420 of FIG. 4A) separated from the polyhedron. In other words, subjection of the information face to the MGUI component means that the information face operates in connection with the MGUI component and displays information, regardless of whether the information face forms the polyhedron component of the MGUI or takes another form separated from faces forming the polyhedron component.

FIG. 4A shows a polyhedron component 410 of the MGUI that takes the form of a hexahedron having six faces, each of which has attributes of an information face and each displays information. A square next to the polyhedron (hexahedron) component 410 is an information face 420 visualized on a screen, like a single component. In this case, the information face is displayed on a screen as a two-dimensional plane having no depth, like a window of a conventional GUI. When information displayed by the polyhedron (hexahedron) component 410 changes or the polyhedron (hexahedron) component 410 operates, information changes and operates accordingly.

Texts, images, moving images, and two-dimensional widgets, which are two-dimensional visual information, can be displayed on the information face 420. Three-dimensional information 430 such as three-dimensional icons can also be displayed on the information face 420, as shown in FIG. 4B. In this case, the three-dimensional information 430 can be regarded as being attached to the information face 420.

If the information face is defined according to attributes of the MGUI component, the form in which information is displayed on the information face may vary according to the attributes assigned to the polyhedron component. For example, the size of or amount of information displayed on the information face may change according to the size of the polyhedron component in which the information face is defined or the size of the information face.

Figure 5:
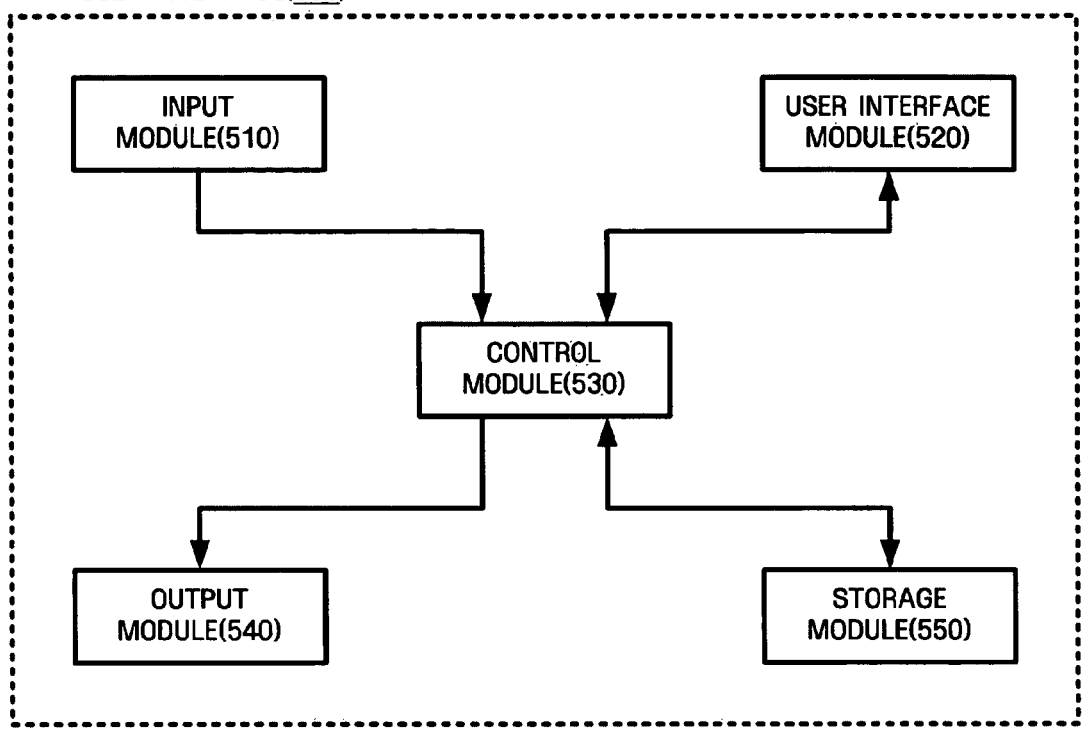
FIG. 5 is a block diagram of an apparatus for providing a three-dimensional MGUI according to an exemplary embodiment of the present invention.

FIG. 5 is a block diagram of an apparatus 500 for providing a three-dimensional MGUI according to an exemplary embodiment of the present invention.

The apparatus 500 for providing a three-dimensional MGUI according to an exemplary embodiment of the present invention may be a digital device. Here, the digital device has a digital circuit that processes digital data, examples of which include a computer, printer, scanner, pager, digital camera, facsimile, digital photocopier, personal digital assistant (PDA), mobile phone, digital appliance, digital telephone, digital projector, home server, digital video recorder, digital TV broadcast receiver, digital satellite broadcast receiver, and a set-top box.

The apparatus 500 for providing a three-dimensional MGUI according to exemplary embodiments of the present invention includes an input module 510, a user interface module 520, a control module 530, an output module 540, and a storage module 550.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The control module 530 creates an MGUI space or a polyhedron component and connects and manages different modules.

The storage module 550 stores the MGUI space or the polyhedron component created by the control module 530.

Data about user behavior with respect to a polyhedron component is input to the input module 510. User behavior includes accessing a polyhedron component, selecting a specific polyhedron component, selecting a specific information face of the polyhedron component or a specific menu on an information face, and operating a polyhedron component.

The output module 540 displays data processed by the user interface module 520 using a display device.

The user interface module 520 will be described with reference to FIG. 6.

Figure 6:
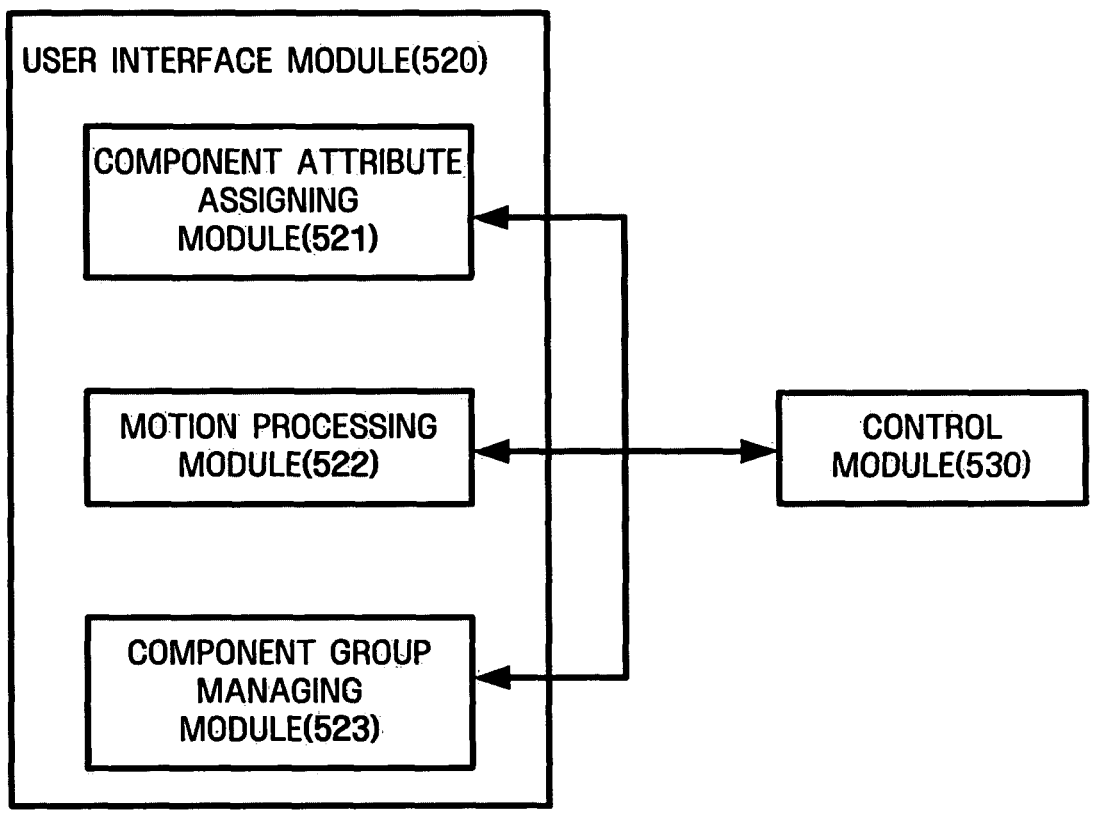
FIG. 6 is a detailed block diagram of a user interface module shown in FIG. 5.

FIG. 6 is a detailed block diagram of the user interface module 520 shown in FIG. 5. The user interface module 520 provides a user interface using the MGUI space or the polyhedron component created by the control module 530, and it includes a component attribute assigning module 521, a motion processing module 522, and a component group managing module 523.

The component attribute assigning module 521 assigns the attributes described with reference to FIGS. 3A through 3C to the polyhedron component created by the control module 530 and maps information displayed on an information face of the polyhedron component according to the assigned attributes. In addition, the component attribute assigning module 521 determines information about a group of information objects that are contained in the internal space of the polyhedron component according to the information or menu selected by the user and maps the information. Further, the component attribute assigning module 521 determines information displayed by the information objects that are contained in the internal space of the polyhedron component according to a face on which a focus is placed by a user, and maps the information.

The motion processing module 522 processes motion of a polyhedron component in an MGUI space according to the data about user behavior, which is input through the input module 510, and maps information displayed on an information face of the polyhedron component or information objects contained in the internal space of the polyhedron component through the component attribute assigning module 521.

The component group managing module 523 receives data about a specific polyhedron selected by a user from a group of polyhedron components through the input module 510, highlights the selected polyhedron, and modifies information mapped onto an information face of the selected polyhedron through the component attribute assigning module 521. Also, the component group managing module 523 changes display forms of other polyhedron components that are not selected in the group. As such, the user interface module 520 includes modules 521, 522 and 523 that are divided according to their respective functions, and data about a user interface processed by the modules is managed by the control module 530 and is displayed by the output module 540.

Figure 7:
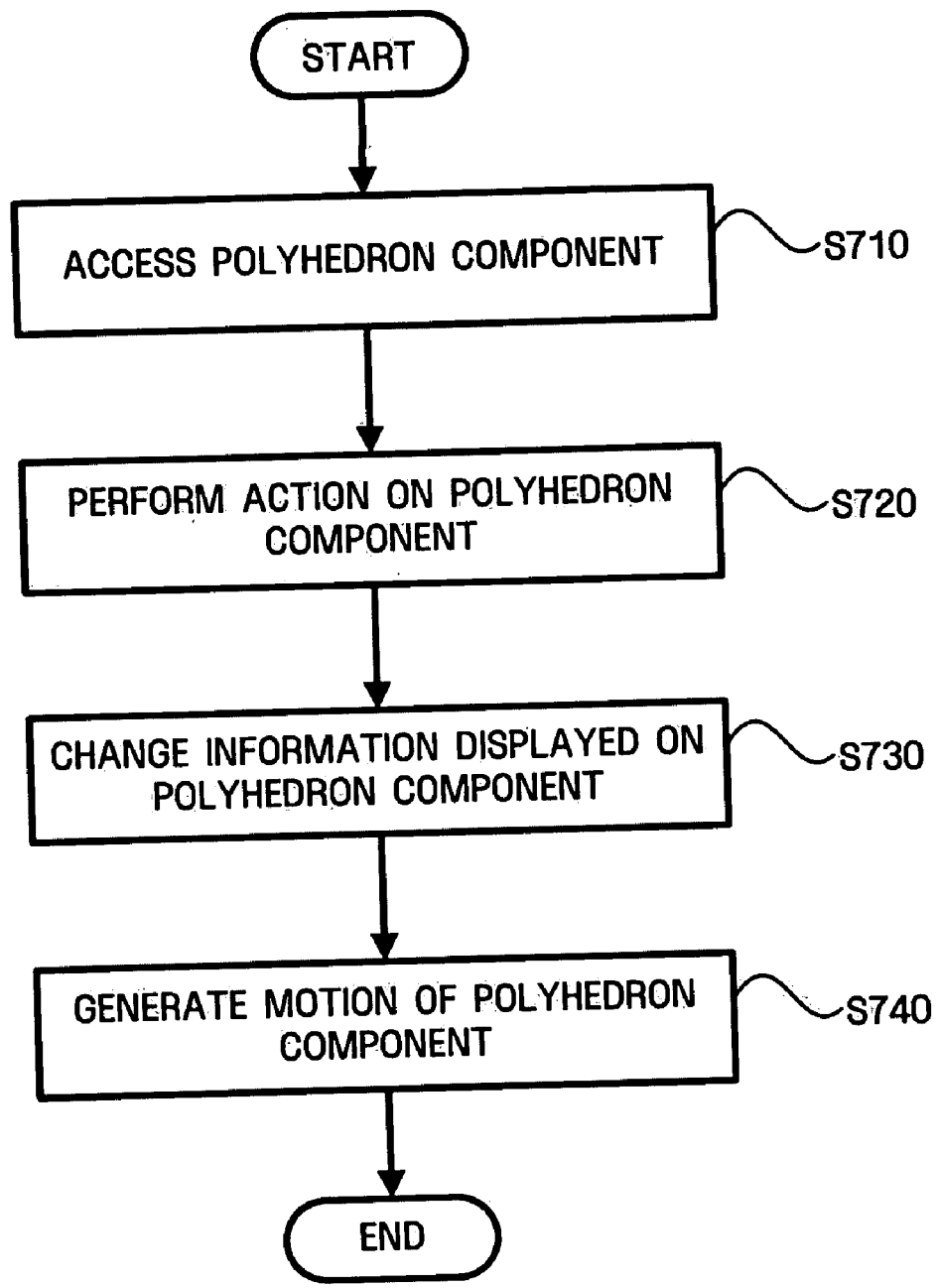
FIG. 7 is a flowchart illustrating a process of generating motion of a polyhedron component in response to a user's action.

FIG. 7 is a flowchart illustrating a process of generating motion of a polyhedron component in response to user behavior.

A polyhedron component of an MGUI is a dynamic three-dimensional UI component whose motion is generated according to user behavior. A process of generating motion is as follows. A user accesses a polyhedron component in step S710 and performs a specific action on the polyhedron component in step S720. Information displayed on information faces of the polyhedron component change according to a user's action in step S730 and motion of the polyhedron component is generated in step S740.

In another exemplary embodiment, motion of a polyhedron component may be generated without a change in information displayed on information faces of the polyhedron component. In the case of a polyhedron component having a cover, information objects contained in the internal space of the polyhedron component may change according to motion of the polyhedron component, a main body, or the cover.

A user can access a polyhedron component (step S710) by accessing a specific polyhedron component that displays information of interest in an MGUI environment. Access can be made using various input devices such as a mouse, a keyboard, a keypad, or a touch pad.

A user (step S720) can open a opening face of the polyhedron component, select a specific menu on an information face of the polyhedron component, move or rotate the polyhedron component, or change the size of the polyhedron component to search for necessary information. The process that the polyhedron component shows information objects when the opening face is opened will be explained on reference to FIG. 8. Opening the opening face, selection of a specific menu and movement or rotation of the polyhedron component can be performed using various input devices such as a mouse, a keyboard, a keypad, or a touch pad. For example, selection of a specific menu can be made by clicking a selection button on a keypad, and movement or rotation of the polyhedron component can be performed using an arrow button on the keypad. In another exemplary embodiment, if a polyhedron component whose motion is to be generated is specified, motion menus that can be selected by a user pop up on the screen and the user can perform an action on the polyhedron component by selecting a motion menu corresponding to the action. The input module 510 of the apparatus 500 provides data about the user's action to the user interface module 520 through the control module 530.

When a user performs an action on the polyhedron component, information displayed on information faces of the polyhedron component can be changed according to the user's action. This is achieved by modifying information mapped onto the information faces by the component attribute assigning module 521 of the user interface module 520. For example, if a user selects a specific menu on a specific information face in step S720, the component attribute assigning module 521 maps sub menus or sub information of the selected menu onto the information faces of the polyhedron component and the output module 540 displays the result of mapping.

Motion of the polyhedron component, generated by the user's action, is processed by a motion processing module 522 of the user interface module 520. The motion processing module 522 processes the position of the polyhedron component according to motion or data required for display and displays the result of processing through the output module 540.

Figure 8:
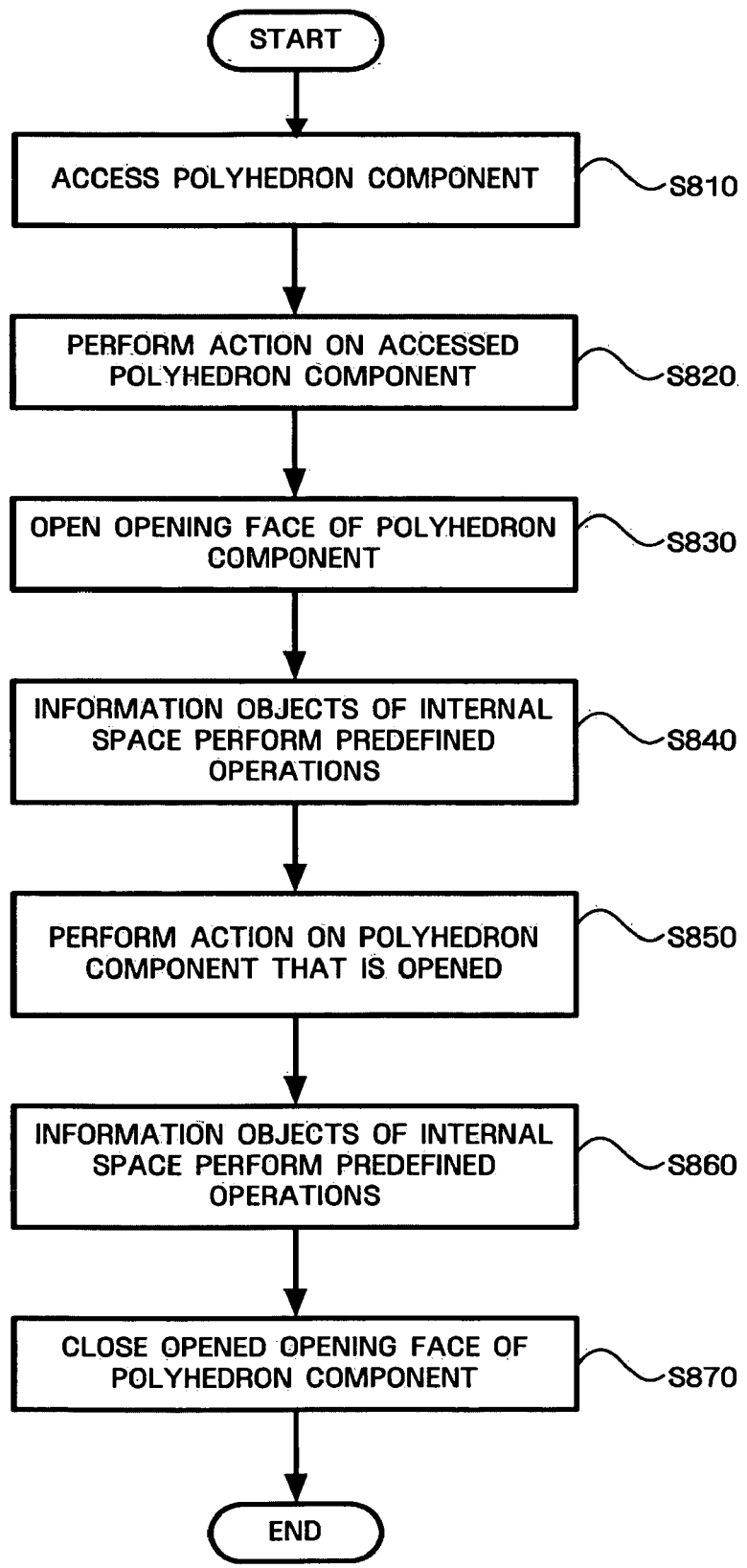
FIG. 8 is a flowchart illustrating a process of displaying an information object by opening a face of a polyhedron component.

FIG. 8 is a flowchart illustrating a process of displaying an information object by opening a face of a polyhedron component.

Once a user accesses a polyhedron component in step S810 and performs a specific action on the accessed polyhedron component in step S820, an opening face of the polyhedron component is opened in step S830. Once the opening face of the polyhedron component is opened, information objects contained in the internal space of the polyhedron component operate according to predetermined attributes in step S840. Once the user checks the information objects contained in the internal space of the polyhedron component and performs a specific action on the polyhedron component in step S850, the information objects perform predetermined operations in step S860, and the opening face is closed in step S870.

A user can access the polyhedron component (step S810) by accessing a specific polyhedron component that displays information of interest in an MGUI environment.

The user's action (step S820) on the polyhedron component can be performed by the following user commands. First, the user may directly issue a command to the opening face (or an information object or a controller displayed on the opening face). Second, the user may issue a command to another information face (or an information object or a controller displayed on the information face) that is related to the opening face. Third, the user may move a specific information object close to the polyhedron component or attempt to move a specific information object inside the polyhedron component. Here, the user commands indicate actions such as user selection, confirmation of the selection, and operations according to the selection. Data about a user's action is provided to the user interface module 520 by the input module 510 under the control of the control module 530.

Once the opening face of the polyhedron component is opened according to a user's action in step S830, the information objects contained in the internal space of the polyhedron component perform predetermined operations in step S840. Step S840 is performed by the component attribute assigning module 521 and the motion processing module 522 of the user interface module 520. In an exemplary embodiment, the information objects contained in the internal space may automatically pop outside at the moment the opening face is opened. In another exemplary embodiment, even when the opening face is opened, the information objects may remain in the internal space of the polyhedron component and then be pulled out by the user individually or by group.

When the information objects are content like moving images that can be displayed, displaying may start at the time the opening face is opened. At this time, once the opening face is opened, the information objects may automatically pop outside and then be displayed, or they may be displayed in the internal space of the polyhedron component. When the opening face is opened and the information objects pop outside the polyhedron component, specific effects or operations including a size increase or decrease, a color change, and a form change may occur.

To close the opening face, the user performs a specific action on the polyhedron component in step S850. Such a specific action (S850) may be performed by the following user command. First, the user may directly issue a command to the opened opening face or an information object or a controller displayed on the opened opening face. Second, the user may issue a command to another information face related to the opened opening face or an information object or a controller displayed on the information face. Third, the user may pull out a specific information object contained in the internal space of the polyhedron component. Fourth, the opened opening face may be automatically closed after a predetermined amount of time following the opening.

Before the opened opening face is closed, the information objects contained in the internal space stop operating and they are moved back into the internal space in step S860. The information objects pulled outside may remain outside regardless of whether the opened opening face is closed. In the case of polyhedron components having a hierarchical structure, closing of opening faces is consecutively performed from lower to upper polyhedron components, which will be described in more detail later with reference to FIG. 15.

Motion of the polyhedron component includes a position change, a size change, rotation, spring lock and opening or closing of an opening face. Here, a reference face for the motion may be a front face of the polyhedron component or a face that is opposite to the user. In another exemplary embodiment, the user may select a motion reference face using various input devices. In still another exemplary embodiment, a pointer is placed on a motion reference face and the user may select the motion reference face by moving the pointer. Each type of motion will be described with reference to FIGS. 9 through 15.

Figure 9:
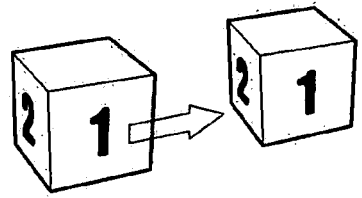
FIG. 9 illustrates an exemplary embodiment in which the position of a polyhedron component changes during motion of the polyhedron component.

FIG. 9 illustrates an exemplary embodiment in which the position of a polyhedron component changes during motion of the polyhedron component.

After a user selects a specific polyhedron component, the user designates a corresponding position to which the selected polyhedron component is to be moved using various input devices, thereby moving the selected polyhedron component to the designated position. For example, when a mouse is used as the input device, the user selects a desired polyhedron component by clicking the polyhedron component using the mouse and drags the selected polyhedron component to a desired position.

Figure 10:
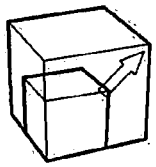
FIG. 10 illustrates an exemplary embodiment in which the size of a polyhedron component changes during motion of the polyhedron component.

FIG. 10 illustrates an exemplary embodiment in which the size of a polyhedron component changes during motion of the polyhedron component.

A user selects a polyhedron component whose size is to be reduced or enlarged and changes the size of the polyhedron component. For example, when a mouse is used as the input device, the size of the polyhedron component can be reduced or enlarged by selecting and dragging a vertex of the polyhedron component.

Figure 11:
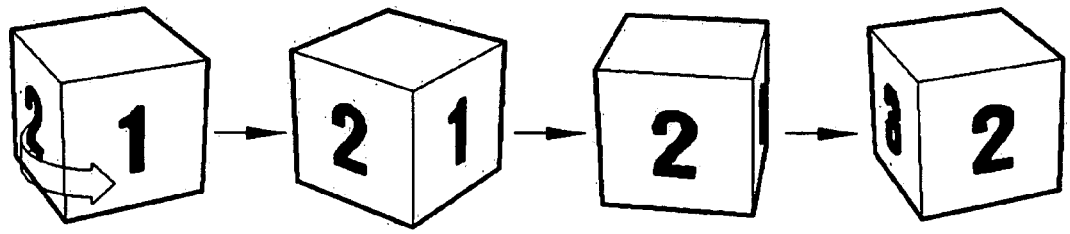
FIG. 11 illustrates an exemplary embodiment in which a polyhedron component rotates during its motion.

FIG. 11 illustrates an exemplary embodiment in which a polyhedron component rotates during its motion.

In FIG. 11, a hexahedron rotates to the right in the positive x-axis direction. However, the polyhedron component may rotate in an arbitrary manner and direction.

Figure 12:
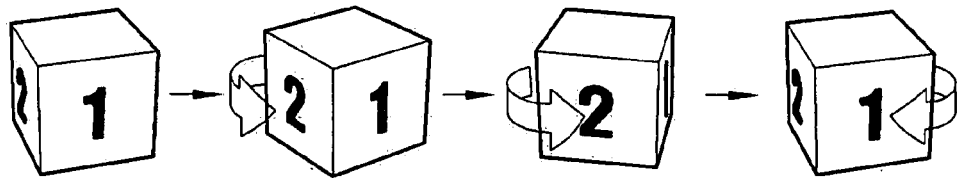
FIG. 12 illustrates an exemplary embodiment in which a polyhedron component is spring-locked during its motion.

FIG. 12 illustrates an exemplary embodiment in which a polyhedron component is spring-locked during its motion.

Spring lock means the polyhedron component rotates a desired angle in a predetermined direction according to a user's action, and it returns to its original state if the user releases it. In another exemplary embodiment, the polyhedron component may remain in a rotated state and then return to its original state upon a user's specific manipulation.

Figure 13A:
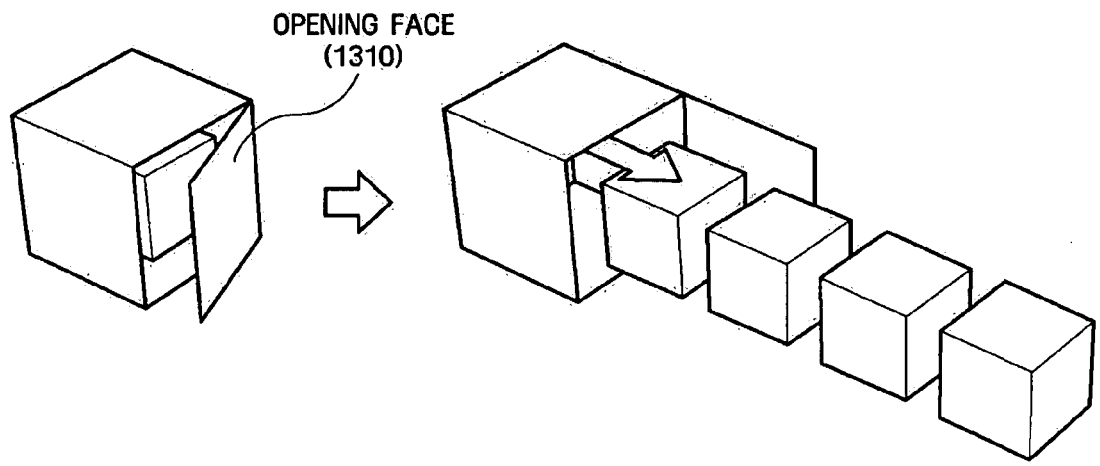
FIGS. 13A and 13B illustrate an exemplary embodiment in which information objects included in a polyhedron component are displayed by opening a face of the polyhedron component during motion of the polyhedron component.
Figure 13B:
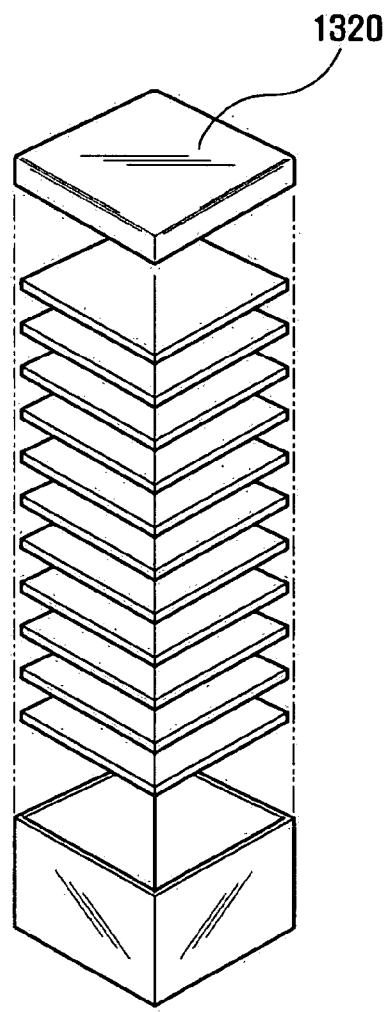

FIGS. 13A and 13B illustrate exemplary embodiments in which an information object included in a polyhedron component is displayed by opening a face of the polyhedron component during motion of the polyhedron component.

As shown in FIG. 8, once an opening face is opened, information objects contained in the internal space of the polyhedron component may perform various motions. In FIGS. 13A and 13B, information objects included in the polyhedron component, which are related to a menu selected by a user, pop outside once opening faces 1310 and 1320 are opened. Presentation and operations of the popping information objects may be differentiated according to attributes of the presentation and operations, which are assigned by the component attribute assigning module 521. All the components of an MGUI can be contained in the internal space of a polyhedron component, and the number of components that can be contained in the internal space is not limited.

Figure 14:
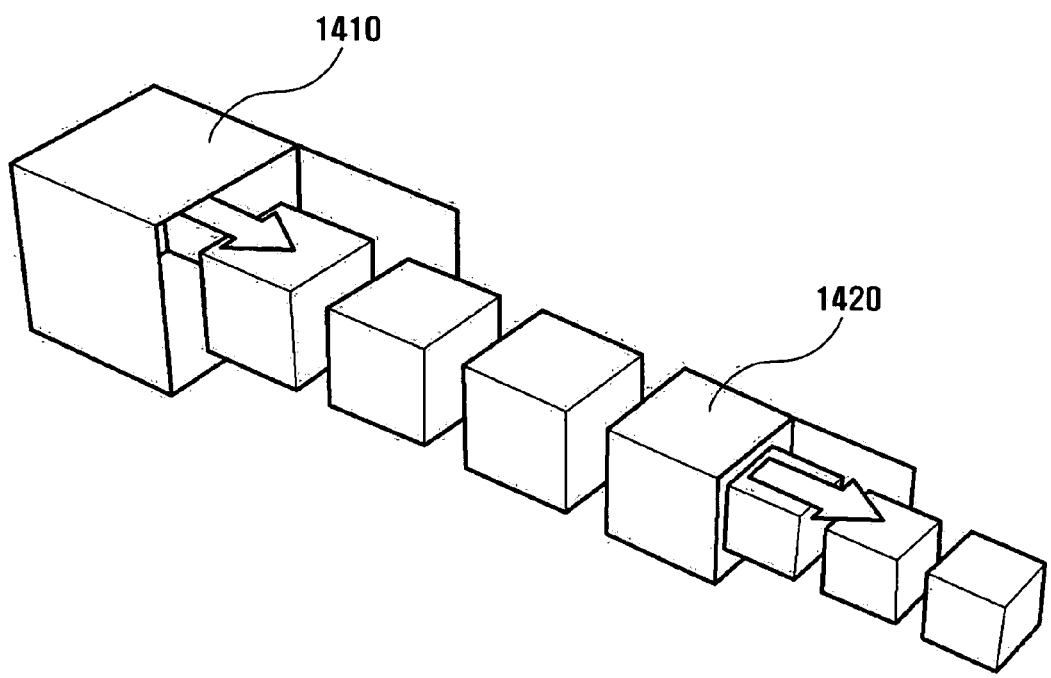
FIG. 14 illustrates motion of a polyhedron component having a hierarchical structure.

FIG. 14 illustrates motion of polyhedron components having a hierarchical structure.

When at least one lower component among components contained in the internal space of an upper polyhedron component 1410 is a polyhedron component 1420, once an opening face of the upper polyhedron component 1410 is opened, the components contained in the internal space perform predetermined operations. Also, an opening face of the lower polyhedron component 1420 is opened and components contained in the internal space of the lower polyhedron component 1420 perform predetermined operations.

When the opening face of the upper polyhedron component 1410 is closed, all the lower components may be moved into the upper polyhedron component 1410 before the opening face is entirely closed. Also, information objects pulled outside may remain outside regardless of whether the opened opening face is closed.

If there is a polyhedron component among lower components, the lower components are moved into the upper polyhedron component 1410 after an opened opening face of the lower polyhedron component is entirely closed. In the case of polyhedron components having a hierarchical structure, closing of opening faces is consecutively performed from lower to upper polyhedron components.

As described above, while motion of the polyhedron component is generated by a user, it may also be generated by a change in the MGUI space (a change in the division type of the MGUI space or a space reduction or enlargement) or changes in the camera view, which is a viewpoint in the MGUI space.

Figure 15:
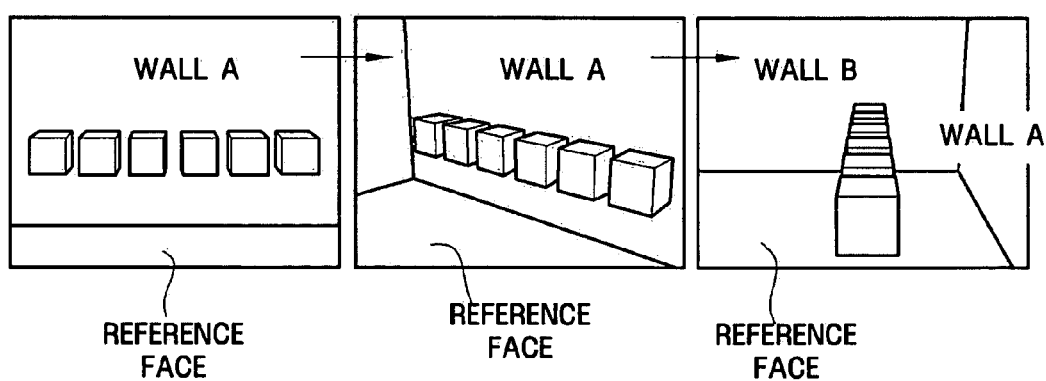
FIG. 15 illustrates an exemplary embodiment in which motion of a polyhedron component is generated according to changes in a camera view.

In FIG. 15, as a camera view rotates to the left, all the polyhedron components in the MGUI space rotate to the right. In addition, if the camera view is zoomed out, all the polyhedron components in the MGUI space look reduced in size. If the camera view is zoomed in, all the polyhedron components in the MGUI space look enlarged.

The MGUI may include a plurality of polyhedron components. By managing a plurality of polyhedron components as a group, it is possible to give unity to presentation or movement in a UI and provide a user with a UI that is efficient when doing information searches.

Figure 16:
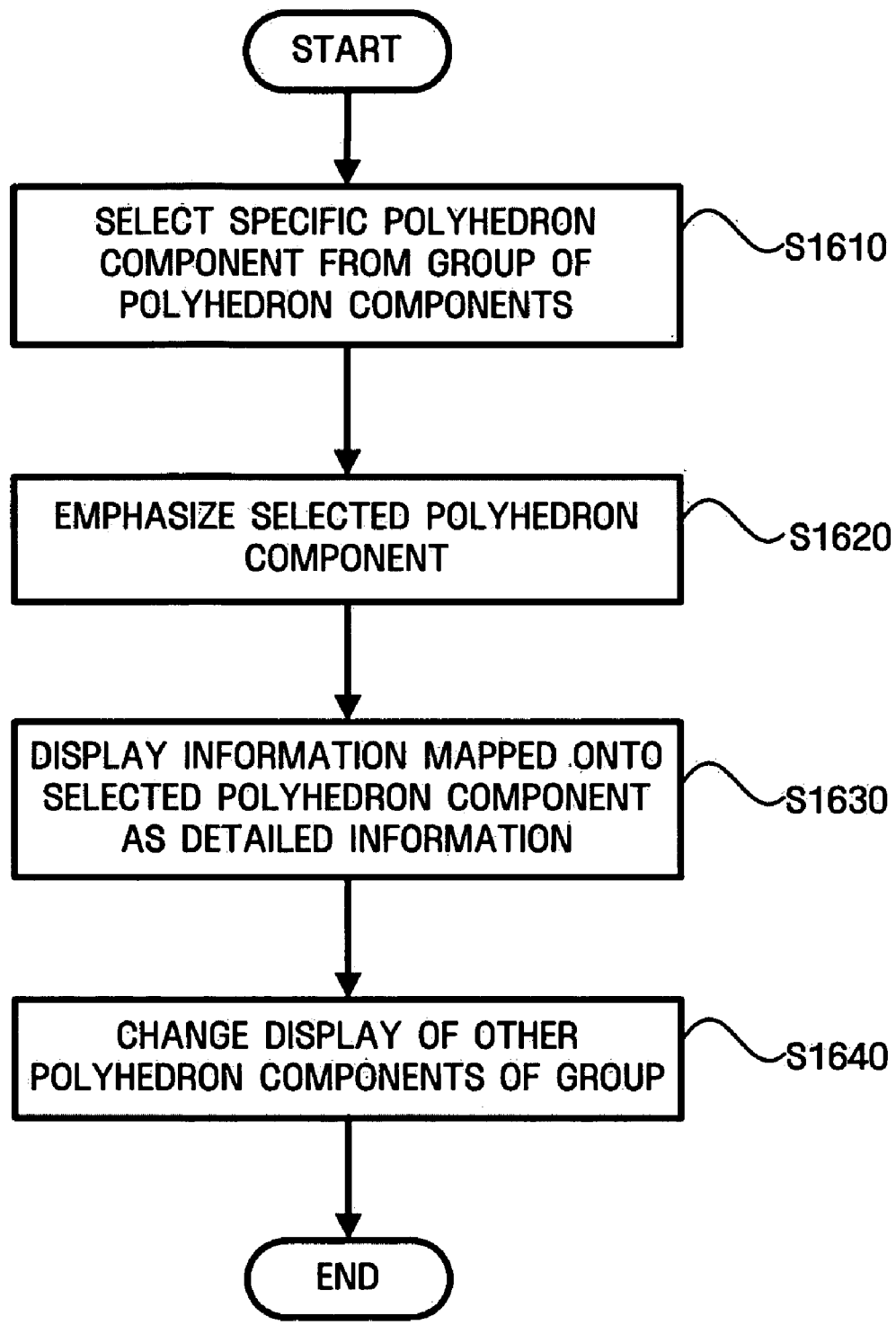
FIG. 16 is a flowchart illustrating a process of displaying information by a user interface comprised of a plurality of polyhedron components.

FIG. 16 is a flowchart illustrating a process of displaying information via a user interface using a plurality of polyhedron components.

If a user selects a specific polyhedron component from a group of polyhedron components in step S1610, the selected polyhedron component is emphasized in step S1620. Information mapped onto an information face of the selected polyhedron component may be displayed as detailed information in step S1620. The other polyhedron components from the group are displayed differently from the selected polyhedron component in step S1640.

User selection of a specific polyhedron component from a group of polyhedron components (step S1610) can be made by accessing and selecting the specific polyhedron component using various input devices like a mouse, a keyboard, a keypad, and a touch pad. If the user selects a specific polyhedron component using various input devices, the input module 510 transfers information about the user's selection to the component group managing module 523 of the user interface module 510 through the control module 530.

After completion of user selection, the selected polyhedron component is emphasized in step S1620. This emphasis may be made by enlarging the selected polyhedron component or moving the selected polyhedron component close to the user (in the positive z-axis direction). In another exemplary embodiment, the emphasis may be made by changing the color of the selected polyhedron component or marking the edges of the selected polyhedron with bold lines. In still another exemplary embodiment, the selected polyhedron component may be marked with a focus or other marks.

If a specific polyhedron component is selected, in step S1630 an information face of the selected polyhedron component may display more detailed information than the information mapped by the component attribute assigning module 521. Alternatively, the selected openable polyhedron component can be emphasized by reducing the size of the other openable polyhedron components from the group, moving the other openable polyhedron components away from the user, or fading the colors of the other openable polyhedron components. This represents information continuity. Step S1640 is performed by the component group managing module 523 and the component attribute assigning module 521.

FIGS. 17 through 22 illustrate exemplary embodiments in which groups of a plurality of polyhedron components are presented.

Figure 17:
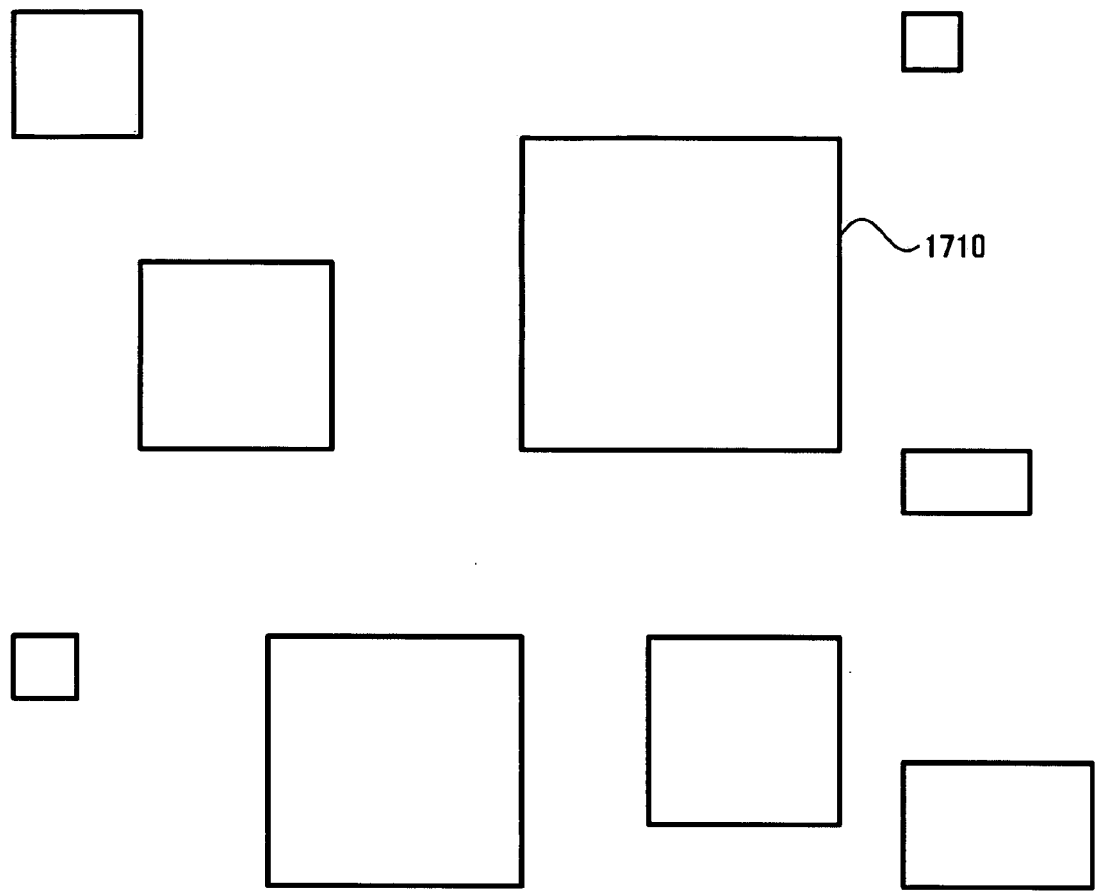
FIGS. 17 through 22 illustrate exemplary embodiments in which groups of a plurality of polyhedron components are presented.

FIG. 17 illustrates a presentation in which changes are made to the sizes of the polyhedron components to allow a user to intuitively recognize information of importance or unimportance. In other words, information of a polyhedron component that is closer to the user (along the z-axis) is more important, and information of the polyhedron component that is away from the user (along the z-axis) is less important. Thus, if a polyhedron component that is away from the user is pulled forward, it can be enlarged. If a polyhedron component that is close to the user is pushed backward, it can be reduced in size. At this time, as a selected polyhedron component 1710 is enlarged, neighboring polyhedron components that may collide with the enlarged polyhedron component are reduced in size. Selection of a polyhedron component can be made by moving a focus or horizontally or vertically moving components while fixing a focus.

Figure 18:
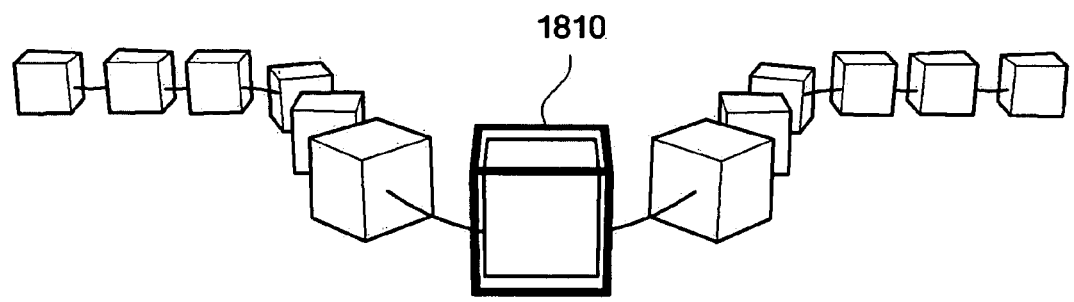

FIG. 18 illustrates a presentation in which only a selected polyhedron component 1810 is enlarged and other polyhedron components are displayed gradually smaller to illustrate the natural connection between information. In such presentation, a plurality of polyhedron components can be connected in the form of a curved line as shown in FIG. 18. In another exemplary embodiment, a plurality of polyhedron components can be connected in the form of a circle or a straight line. Selection of a polyhedron component can be made by moving a focus or horizontally or vertically moving components while fixing a focus.

Figure 19:
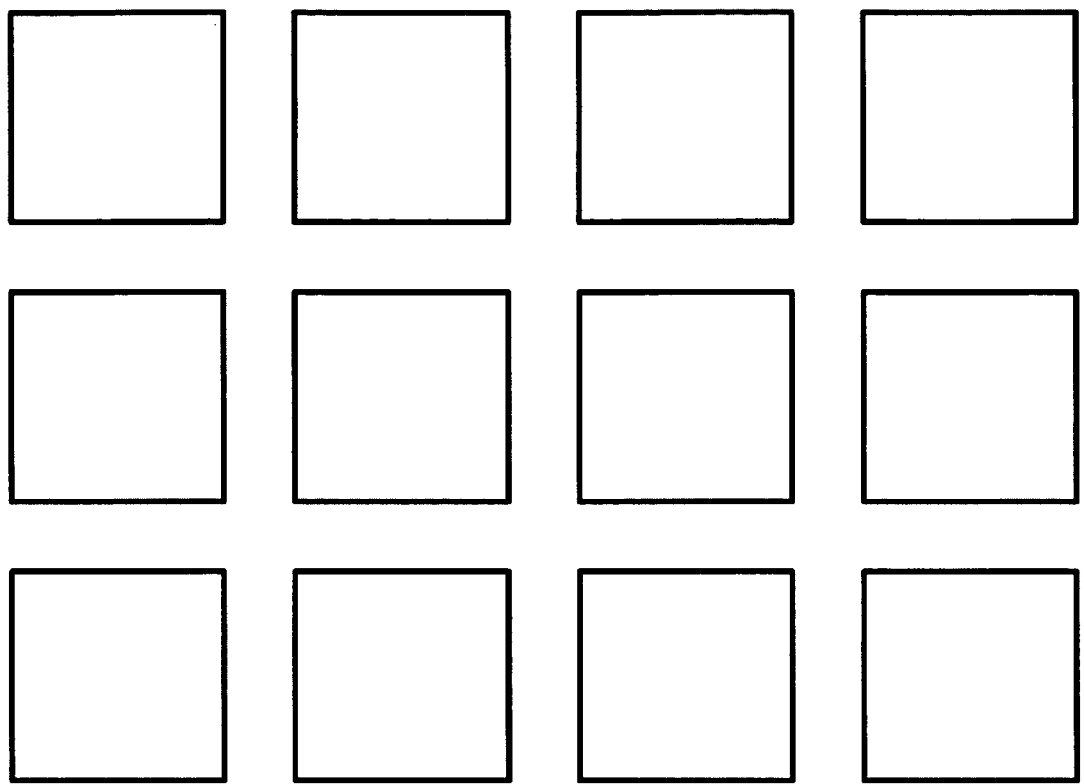

FIG. 19 illustrates a presentation in which polyhedron components of the same size are arranged in the form of a lattice and a selected polyhedron component is enlarged to a full screen. Such a presentation spreads information to briefly show a large amount of information. If a user selects a desired component for more detailed information, the selected component is enlarged.

Figure 20:
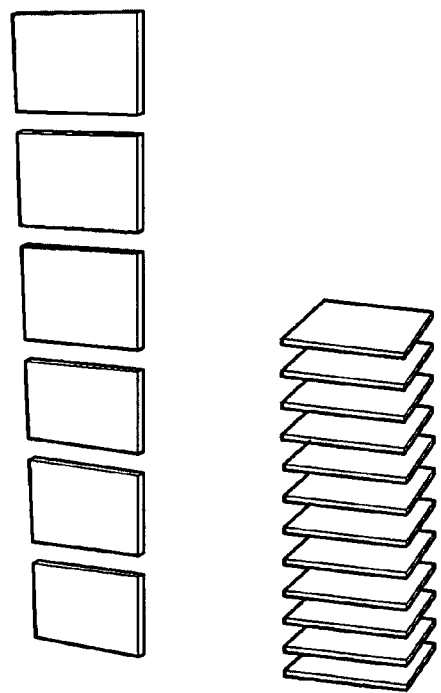

FIG. 20 illustrates a presentation in which various polyhedron components of the same size are spread in a line or stacked. Thus, this presentation allows a user to efficiently search for information. If the user moves polyhedron components vertically using an input device and selects a specific component, a space is created above the selected polyhedron component to display more detailed information. Selection of a component can be made by moving a focus or horizontally or vertically moving components while fixing a focus.

Figure 21:
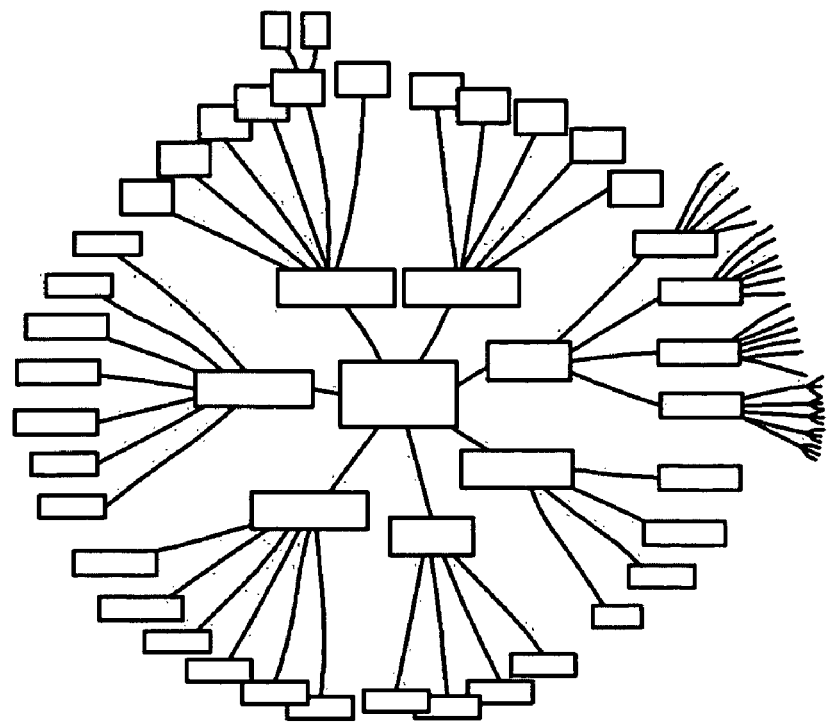

FIG. 21 illustrates a presentation in which a plurality of polyhedron components are arranged in a radial form to allow a user to recognize a tree structure of information with a single glance. If the user selects a component, on which information of interest is displayed, the selected component is enlarged and related information is displayed. At this time, neighboring components that are not selected are reduced in size or moved away from the user.

Figure 22:
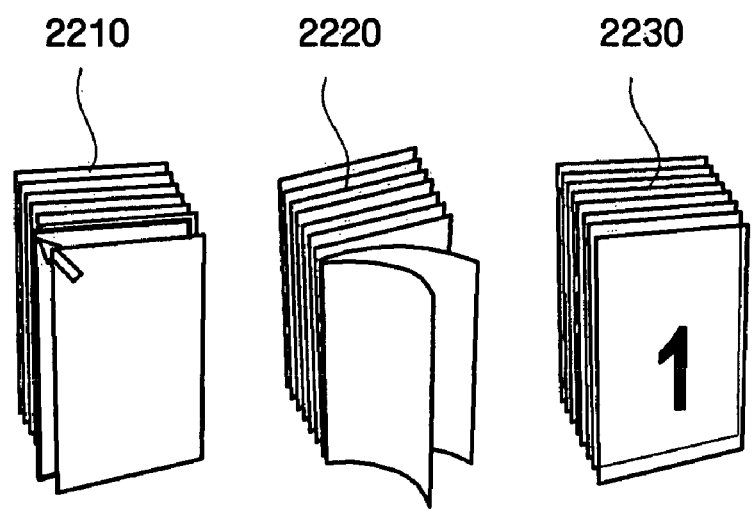

FIG. 22 illustrates a presentation in which information faces displaying a large amount of information overlap one another, information of a currently selected component is positioned at the front, and other information of less importance is positioned behind the selected component. A user can display one of overlapping information faces in the following manners.

First, a user selected information face is slid to then be popped outside (2210). In this case, a direction of sliding, a timing point of sliding and a position where sliding stops can be set in different manners at a UI design stage. Second, the user selected information face is shown in a flipped manner, in which all the information faces preceding the user selected information face are flipped (2220), which is similar to the manner in which pages of a book are turned. Third, all the information faces preceding the user selected information face are made transparent (2230).

A method and apparatus for providing information according to exemplary embodiments of the present invention provide at least the following advantages.

First, dynamic, three-dimensional UI is provided using three-dimensional components, thereby providing information that is intuitive and satisfying to a user.

Second, it is easy to arrange or move a single object or groups of information objects in a three-dimensional GUI environment by providing a three-dimensional folder concept.

Third, user recognition errors can be reduced by providing a natural information flow in a three-dimensional GUI environment.

Fourth, a user can view and control information from various angles, thereby better understanding the information.

Fifth, it is also possible to display more information than conventional UIs by displaying information on faces of polyhedron components.

It will be understood by those of ordinary skill in the art that various changes in form and details may be made therein without departing from the spirit and scope of the present invention as defined by the following claims. Therefore, the scope of the invention is given by the appended claims, rather than the preceding description, and all variations and equivalents which fall within the range of the claims are intended to be embraced therein.

What is claimed is:

1. A non-transitory computer-readable medium having embodied thereon a program for providing a three-dimensional motion graphic user interface (MGUI), the MGUI comprising:
    at least two opening faces which forms a polyhedron component that can be opened; and
    an internal space which is completely surrounded so as to be enclosed by faces of the polyhedron component and which contains at least one information object related to information displayed on a face of the polyhedron component,
    wherein at least one of a plurality of faces that are subordinate to the polyhedron component has predetermined attributes,
    the information is displayed differently according to the predetermined attributes,
    wherein information objects contained in the internal space change according to a face on which a focus is placed,
    wherein a size of the polyhedron component is reduced or enlarged according to an action by a user,
    wherein if the user requests opening a face of the polyhedron, the face is opened and the information objects contained in the internal space pop outside the polyhedron component without further action by the user,
    wherein the information objects are moving images that are displayed at the time the face is opened and wherein speed with which the face is opened is one of the attributes of the opened face, and
    wherein the speed attribute is set independently for at least one of the two opening faces.

2. The non-transitory computer readable medium of claim 1, wherein the predetermined attributes include at least one of a size of the polyhedron component, color of a face of the polyhedron component, extent of transparency of a face of the polyhedron component, information on whether a face is an information face, information on whether a face is an opening face, a way the opening face is opened, an opening speed of the opening face, information about edges of the opening face, which are attached to or detached from the polyhedron component, information about the information objects contained in the internal space of the polyhedron component, information about the presentation and operations of the information objects contained in the internal space of the polyhedron component, and a color of an edge of the polyhedron component.

3. The non-transitory computer readable medium of claim 1, wherein the information displayed on the face of the polyhedron component is displayed differently according to a viewpoint with respect to the polyhedron component in an active space.

4. The non-transitory computer readable medium of claim 1, wherein a position of the polyhedron component is changed according to a user's action.

5. The non-transitory computer readable medium of claim 1, wherein the size of the polyhedron component is reduced or enlarged by selecting and dragging a vertex of the polyhedron component.

6. The non-transitory computer readable medium of claim 1, wherein the polyhedron component rotates with respect to one or more axes according to a user's action.

7. The non-transitory computer readable medium of claim 1, wherein the polyhedron component rotates with respect to one or more axes according to a user's action and then returns to its original state.

8. The non-transitory computer readable medium of claim 1, wherein when a plurality of polyhedron components is grouped, the polyhedron components in the same group have at least one identical attribute.

9. An apparatus including a memory and processor for providing a three-dimensional motion graphic user interface (MGUI), the apparatus comprising:
   a control circuit that creates a polyhedron component that can be opened and that has at least two opening faces and an internal space that is completely surrounded so as to be enclosed by faces of the polyhedron component and that contains at least one information object related to information displayed on a face of the polyhedron component;
   a storing circuit that stores the polyhedron component created by the control circuit;
   an input circuit to which data about an action by a user with respect to the polyhedron component is input;
   a user interface circuit which assigns predetermined attributes to at least one of a plurality of faces subordinate to the polyhedron component, maps information displayed on an information face according to the predetermined attributes, processes motion of the polyhedron component according to the data about the action by the user input through the input circuit, and changes an information display according to the motion of the polyhedron component; and
   an output circuit that displays a processing result of the user interface circuit,
   wherein information objects contained in the internal space change according to a face on which a focus is placed,
   wherein the motion includes a size change of the polyhedron component according to the action by the user and the size of the polyhedron component is reduced or enlarged,
   wherein if the user requests opening the opening face of the polyhedron, the opening face is opened and the information objects contained in the internal space pop outside the polyhedron component without further action by the user,
   wherein the information objects are moving images that are displayed at the time the face is opened and wherein speed with which the face is opened is one of the attributes of the opened face, and
   wherein the speed attribute is set independently for at least one of the two opening faces.

10. The apparatus of claim 9, wherein the predetermined attributes include at least one of a size of the polyhedron component, color of a face of the polyhedron component, extent of transparency of a face of the polyhedron component, information on whether a face is an information face, information on whether a face is an opening face, a way the opening face is opened, an opening speed of the opening face, information about edges of the opening face, which are attached to or detached from the polyhedron component, information about the information objects contained in the internal space of the polyhedron component, information about presentation and operations of the information objects contained in the internal space of the polyhedron component, and a color of an edge of the polyhedron component.

11. The apparatus of claim 9, wherein the information objects contained in the internal space automatically pop outside the polyhedron component when the opening face is opened.

12. The apparatus of claim 9, wherein when the opening face is opened, the information objects contained in the internal space remain in the internal space and are then pulled out individually or by a group according to a user's action.

13. The apparatus of claim 9, wherein the information displayed on the face of the polyhedron component is displayed differently according to a viewpoint with respect to the polyhedron component in an active space.

14. The apparatus of claim 9, wherein the motion includes a position change of the polyhedron component according to a user's action.

15. The apparatus of claim 9, wherein the size of the polyhedron component is reduced or enlarged by selecting and dragging a vertex of the polyhedron component.

16. The apparatus of claim 9, wherein the motion includes a rotation of the polyhedron component with respect to one or more axes according to a user's action.

17. The apparatus of claim 9, wherein the motion includes a rotation of the polyhedron component with respect to one or more axes according to a user's action and a return to its original state.

18. The apparatus of claim 9, wherein the control circuit manages at least one group of a plurality of the polyhedron components.

19. The apparatus of claim 18, wherein the at least one group of polyhedron components are managed by causing the polyhedron components in a same group to have at least one identical attribute.

20. A method for providing a three-dimensional motion graphic user interface (MGUI), the method comprising:
   a user accessing a polyhedron component including at least two opening faces and an internal space which is completely surrounded so as to be enclosed by faces of the polyhedron component and which contains at least one information object related to information displayed on a face of the polyhedron component;
   the user inputting an action that generates motion of the polyhedron component; and
   motion of the polyhedron component being generated according to the action by the user,
   wherein information objects contained in the internal space change according to a face on which a focus is placed,
   wherein the motion includes a size change of the polyhedron component according to the action by the user and the size of the polyhedron component is reduced or enlarged,
   wherein the motion being generated comprises the information objects contained in the internal space of the polyhedron component whose opening face is opened performing predetermined operations,
   wherein the predetermined operations of the information objects comprise if the user requests opening the opening face, the opening face is opened and the information objects contained in the internal space pop outside the polyhedron component without further action by the user, wherein the information objects are moving images that are displayed at the time the face is opened and wherein speed with which the face is opened is one of the attributes of the opened face, and wherein the speed attribute is set independently for at east one of the two opening faces.

21. The method of claim 20, wherein the motion being generated comprises:

the opening face being opened;

the user inputting an action for closing the opened opening face; and the opened opening face being closed according to the action.

22. The method of claim 20, wherein the motion being generated comprises:

the opening face being opened; and the opened opening face being closed after a predetermined amount of time following the opening of the opening face.

23. The method of claim 20, wherein the motion includes a position change of the polyhedron component according to a user's action.

24. The method of claim 20, wherein the size of the polyhedron component is reduced or enlarged by selecting and dragging a vertex of the polyhedron component.

25. The method of claim 20, wherein the motion includes a rotation of the polyhedron component with respect to one or more axes according to a user's action.

26. The method of claim 20, wherein the motion includes a rotation of the polyhedron component with respect to one or more axes according to a user's action and a return to its original state.

27. A method for providing a three-dimensional motion graphic user interface (MGUI), the method comprising:

selecting a specific polyhedron component from a group of polyhedron components that have at least two opening faces that can be opened on an edge that is attached to the polyhedron component, and that have an internal space that is completely surrounded so as to be enclosed by faces of the polyhedron component and that contains at least one information object related to information displayed on a face of the polyhedron component;

highlighting the selected polyhedron component;

displaying detail information of information displayed on an information face of the selected polyhedron component; and changing a way of displaying other polyhedron components of the group of polyhedron components, wherein information objects contained in the internal space change according to a face on which a focus is placed, wherein the motion includes a size change of the polyhedron component according to an action by a user and the size of the polyhedron component is reduced or enlarged, wherein the motion being generated comprises the information objects contained in the internal space of the polyhedron component whose opening face is opened performing predetermined operations, wherein the predetermined operations of the information objects comprise if the user requests opening the opening face, the opening face is opened and the information objects contained in the internal space pops outside the polyhedron component without further action by the user, wherein the information objects are moving images that are displayed at the time the face is opened and wherein speed with which the face is opened is one of the attributes of the opened face, and wherein the speed attribute is set independently for at least one of the two opening faces.

28. The method of claim 27, wherein once one polyhedron component from the group of polyhedron components is moved, the other polyhedron components of the group of polyhedron components are consecutively moved.

29. The method of claim 27, wherein the highlighting of the selected polyhedron component includes at least one of moving the selected polyhedron component close to a user, enlarging the selected polyhedron component, changing a color of the selected polyhedron component, marking edges of the selected polyhedron component with bold lines, and marking the selected polyhedron component with a focus mark.

30. The method of claim 27, wherein the changing the way of displaying includes at least one of moving the other polyhedron components away from a user, reducing sizes of the other polyhedron components, thinning colors of the other polyhedron components, and marking edges of the other polyhedron components with thin lines.

31. The method of claim 27, wherein the polyhedron components of the group are presented in a form of a tree structure, and when the selected polyhedron component is enlarged, related information is displayed in a form of an enlarged tree structure.

32. A computer-readable storage medium having embodied thereon a program for executing a method for providing a three-dimensional motion graphic user interface (MGUI), the method comprising:

a user accessing a polyhedron component including at least two opening faces and an internal space which is completely surrounded so as to be enclosed by faces of the polyhedron component and which contains at least one information object related to information displayed on a face of the polyhedron component;

the user inputting an action that generates motion of the polyhedron component; and motion of the polyhedron component being generated according to the action by the user, wherein information objects contained in the internal space change according to a face on which a focus is placed, wherein the motion includes a size change of the polyhedron component according to the action by the user and the size of the polyhedron component is reduced or enlarged, wherein if the user requests opening the opening face, the opening face is opened and the information objects contained in the internal space pop outside the polyhedron component without further action by the user, wherein the information objects are moving images that are displayed at the time the face is opened and wherein speed with which the face is opened is one of the attributes of the opened face, and wherein the speed attribute is set independently for at least one of the two opening faces.

33. A computer-readable storage medium having embodied thereon a program for executing a method for providing a three-dimensional motion graphic user interface (MGUI), the method comprising:

selecting a specific polyhedron component from a group of polyhedron components that have at least two opening faces that can be opened on an edge that is attached to the polyhedron component, and that have an internal space that is completely surrounded so as to be enclosed by faces of the polyhedron component and that contains at least one information object related to information displayed on a face of the polyhedron component;
highlighting the selected polyhedron component;
displaying detail information of information displayed on an information face of the selected polyhedron component; and
changing a way of displaying other polyhedron components of the group of polyhedron components,
wherein information objects contained in the internal space change according to a face on which a focus is placed,
wherein the motion includes a size change of the polyhedron component according to an action by a user and the size of the polyhedron component is reduced or enlarged,
wherein if the user requests opening the opening face, the opening face is opened and the information objects contained in the internal space automatically pop outside the polyhedron component without further action by the user,
wherein the information objects are moving images that are displayed at the time the face is opened and wherein speed with which the face is opened is one of the attributes of the opened face, and
wherein the speed attribute is set independently for at least one of the two opening faces.

34. A non-transitory computer-readable medium having embodied thereon a program for providing a three-dimensional motion graphic user interface (MGUI), the MGUI comprising:
at least two opening faces which forms a polyhedron component that can be opened; and
an internal space which is completely surrounded so as to be enclosed by faces of the polyhedron component and which contains at least one information object related to information displayed on a face of the polyhedron component,
wherein at least one of a plurality of faces that are subordinate to the polyhedron component has predetermined attributes,
the information is displayed differently according to the predetermined attributes,
wherein information objects contained in the internal space change according to a face on which a focus is placed,
wherein if the opening face is opened according to a user action, the information objects contained in the internal space remain in the internal space and are then pulled out individually or by a group according to another user action,
wherein if the opened face is closed, the information objects contained in the internal space stop operating and are moved back into the internal space and the information objects pulled outside remain outside regardless of whether the opened face is closed, and
wherein the speed attribute is set independently for at least one of the two opening faces.

35. The non-transitory computer readable medium of claim 34, wherein if the polyhedron components have a hierarchical structure, closing of the opened faces is consecutively performed from lower to upper polyhedron components.

* * * * *